(12) United States Patent
Tzonev et al.

(10) Patent No.: US 9,544,023 B2
(45) Date of Patent: Jan. 10, 2017

(54) CABLE ASSEMBLY FOR PROVIDING POWER THROUGH INDUCTIVE COUPLING

(71) Applicant: Syscor Controls & Automation Inc., Victoria (CA)

(72) Inventors: Nikolay Nikolov Tzonev, Victoria (CA); Dale John Shpak, Victoria (CA); David William Sime, Victoria (CA)

(73) Assignee: Syscor Controls & Automation Inc., Victoria (CA)

( * ) Notice: Subject to any disclaimer, the term of this patent is extended or adjusted under 35 U.S.C. 154(b) by 390 days.

(21) Appl. No.: 14/221,521

(22) Filed: Mar. 21, 2014

(65) Prior Publication Data

US 2014/0285028 A1   Sep. 25, 2014

Related U.S. Application Data

(60) Provisional application No. 61/804,187, filed on Mar. 22, 2013.

(51) Int. Cl.
*H04B 5/00* (2006.01)

(52) U.S. Cl.
CPC .......... *H04B 5/0037* (2013.01); *H04B 5/0018* (2013.01); *H04B 5/0031* (2013.01); *H04B 5/0062* (2013.01); *H04B 5/0075* (2013.01)

(58) Field of Classification Search
CPC ... H04B 5/0037; H04B 5/0018; H04B 5/0031; H04B 5/0062; H04B 5/0075
See application file for complete search history.

(56) References Cited

U.S. PATENT DOCUMENTS

| | | |
|---|---|---|
| 4,029,889 A | 6/1977 | Mizuochi |
| 4,206,402 A | 6/1980 | Ishido |
| 4,336,708 A | 6/1982 | Hobgood et al. |
| 4,457,163 A | 7/1984 | Jackle |
| 4,480,480 A * | 11/1984 | Scott .................. E02B 17/0034 702/41 |
| 4,996,879 A | 3/1991 | Kruka et al. |
| 5,117,676 A | 6/1992 | Chang |
| 5,361,636 A | 11/1994 | Farstad et al. |
| 5,974,862 A | 11/1999 | Lander et al. |
| 6,243,657 B1 * | 6/2001 | Tuck .................. G01N 29/2412 324/207.13 |
| 6,999,857 B1 * | 2/2006 | Kasper ................. H04B 17/327 340/850 |
| 7,564,540 B2 | 7/2009 | Paulson |
| 7,591,285 B2 | 9/2009 | Wittmann |
| 8,098,648 B2 * | 1/2012 | Nakata .................... H04L 12/56 370/254 |
| 2006/0292033 A1 * | 12/2006 | Blok ................... G01N 27/126 422/504 |
| 2010/0259217 A1 * | 10/2010 | Baarman ................. H02J 5/005 320/108 |
| 2013/0106348 A1 * | 5/2013 | Jung ...................... H02J 5/005 320/108 |

(Continued)

*Primary Examiner* — Zeev V Kitov
(74) *Attorney, Agent, or Firm* — Davis & Bujold PLLC; Michael J. Bujold

(57) ABSTRACT

A Cable Assembly for supplying power includes wiring for carrying alternating electrical current, a plurality of Source Inductive Elements spaced at intervals along the wiring to provide power by induction; and an encapsulation layering that provides electrical insulation.

10 Claims, 4 Drawing Sheets

(a)

(b)

(56) References Cited

U.S. PATENT DOCUMENTS

2013/0134792 A1* 5/2013 Bunsen ................. G01R 27/04
                                                     307/104
2014/0333148 A1* 11/2014 Uchida ................... H02J 5/005
                                                     307/104
2015/0246614 A1* 9/2015 Dames .................... B60L 5/005
                                                      191/10

* cited by examiner (a)

(b)

(a)

(b)

CABLE ASSEMBLY FOR PROVIDING POWER THROUGH INDUCTIVE COUPLING

FIELD

There is described a cable assembly for providing power through inductive coupling. This cable assembly was developed for use in remote sensing applications but has broader potential application.

BACKGROUND

The use of sensors for remote monitoring is ubiquitous because it facilitates the monitoring of industrial or environmental conditions that would otherwise be economically unfeasible to monitor. Examples include the monitoring of manufacturing plants, monitoring soil moisture in agriculture, or monitoring pipelines for leaks. The current invention will be presented in the context of pipeline monitoring but those skilled in the art will recognize that it can be applied to numerous types of sensor monitoring applications.

Pipelines are widely used for transporting commodities such as water, natural gas, or petroleum products. Leakage from a pipeline can result in significant economic losses or environmental damage and, therefore, there is a great interest in mitigating any such damages from pipeline operations. Assurances from pipeline companies regarding the adequate monitoring of a proposed pipeline may also be a major factor in determining whether or not a pipeline can be built.

Although there are existing methods for pipeline monitoring, they are often not adopted in industry because of their excessive cost, low reliability, or poor accuracy. An overview of some existing methods follows.

U.S. Pat. No. 4,029,889 (Mizuochi) uses a coaxial cable where the outer jacket is water-resistant but is either permeable to petroleum or dissolved by petroleum. When the petroleum permeates the insulation between the shield and the center conductor, there is a local change in the electrostatic capacity. This change can be detected by transmitting a pulse down the cable and monitoring the reflected waveform.

U.S. Pat. No. 4,206,402 (Ishido) also utilizes a coaxial cable, but in this case the cable is segmented and individual segments are monitored for changes in its electrical properties.

U.S. Pat. No. 4,336,708 (Hobgood et al.) uses a temperature-based system for localizing leaks. However, this system is for localizing leaks in a section of pipe where a leak is known to exist. It is not a monitoring system for the detection of leaks.

There are several methods in the prior art that use acoustic means, U.S. Pat. No. 4,457,163 (Jackle) monitors the acoustic emissions along a pipeline to detect and localize leaks. In U.S. Pat. No. 4,996,879 (Kruka, et al.) sonic energy is introduced into an underwater pipeline and an array of hydrophones is used to localize the leak. U.S. Pat. No. 5,117,676 (Chang) uses a plurality of microphones to monitor a natural gas pipeline where the expected characteristic frequency of the emissions can be determined from the pipeline characteristics. In U.S. Pat. No. 5,361,636 (Farstad et al.) acoustic means are used to determine the rate of leakage through a valve within the pipeline. In this case, the leaked contents are contained within the pipeline system. In U.S. Pat. No. 5,974,862 (Lander, et al.), signals from a plurality of acoustic sensors are digitized and transmitted to a system where their signals can be analyzed using cross-correlation.

In U.S. Pat. No. 7,564,540 (Paulson), two fiber-optic based measurements are used. The first uses an interferometer to detect and classify anomalies in the received optical signal. The second measurement uses time-domain reflectrometry or Brillouin scattering to localize the detected anomaly.

In U.S. Pat. No. 7,591,285 (Wittmann), which is for aboveground pipelines, fluid that escapes from the pipe is collected by a catchment system and pooled at the location of the sensor element.

SUMMARY

The first aspect of the current invention is an encapsulated Cable Assembly for providing power using inductive means. This cable minimally comprises wiring for transmitting power and a plurality of Source Inductive Elements that are connected to the wires and where the entire assembly is covered with a protective coating, such as plastic. Each said Source inductive Element is essentially the first winding of a transformer.

The second aspect of the invention is a Monitoring Node, which is powered from the Cable Assembly using a Sink Inductive Element that is essentially the second winding of the aforementioned transformer. That is, the mutual induction between the Source Inductive Element and the Sink Inductive Element constitutes a transformer. However, since the Sink Inductive Element is external to the Cable Assembly there is no need to penetrate the encapsulation of the Cable Assembly to extract power.

Each Monitoring Node can store data for retrieval at some later time or use wireless means to communicate with other components of the monitoring system. Alternatively, any Monitoring Node can use wires in the Cable Assembly for data communication by inductively coupling its data signal to these wires, which may be the same wires that carry the power.

In the current embodiment, each Monitoring Node comprises a microcontroller, multiple sensor interfaces, and a power supply that uses current supplied by a Sink Inductive Element. The Sink Inductive Element is preferably installed in close proximity to a Source Inductive Element in the Cable Assembly, thereby facilitating power transfer from the Cable Assembly to the power supply.

Any Monitoring Node can have a data storage element (such as flash memory). Any Monitoring Node can have a wireless or inductively coupled communication element for communicating with another Monitoring Node or with a component in a system control and data acquisition (SCADA) system.

If required, each Monitoring Node can be connected to a plurality of sensors, thereby reducing the number of Monitoring Nodes. In some applications, such as pipeline monitoring, these sensors could all be hydrocarbon sensors that are located along the pipeline. For example, the spacing of Monitoring Nodes could be fifty meters and each node could have ten connected sensors spaced at five-meter intervals. Any sensor could also be placed at some lateral distance from the pipeline if there is a requirement for monitoring such locations.

A further potential benefit of the invention is that the ease of installation and low installed cost may serve to hasten the upgrading of safety-critical infrastructure.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1(*b*) is an electrical diagram of a Cable Assembly wired in a parallel circuit.

FIG. 2(*b*) is a partially cut away section View of a Cable Assembly wired in parallel, with cut away sections revealing Source Inductive Elements.

DETAILED DESCRIPTION

A Cable Assembly for providing power will now be described with reference to FIG. 1 through 4.

Figure 1:
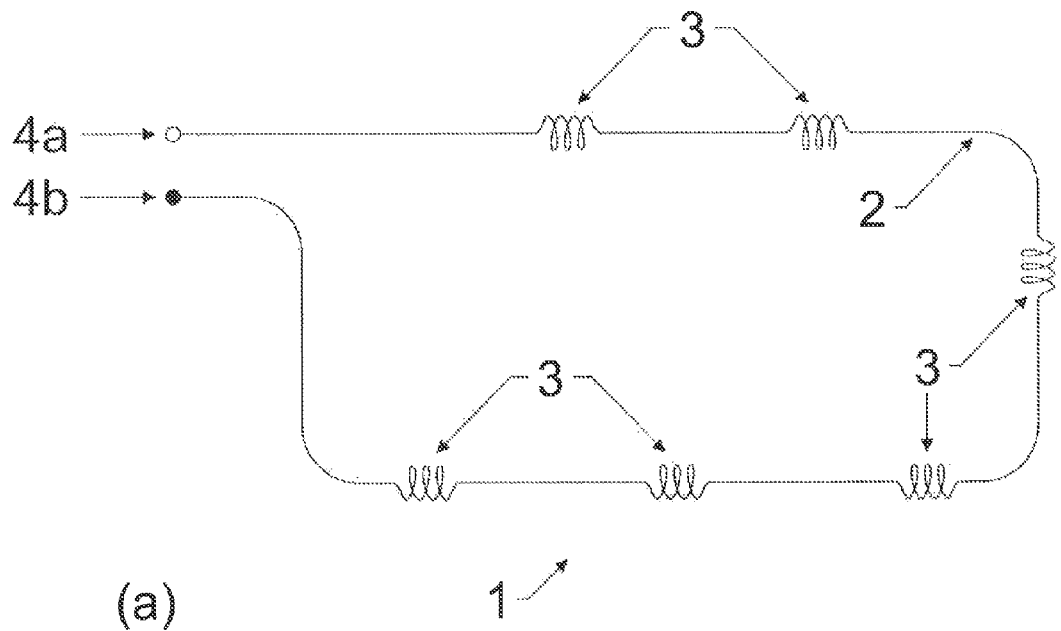
FIG. 1 (*a*) is an electrical diagram of a Cable Assembly wired in a series circuit.
Figure 1:
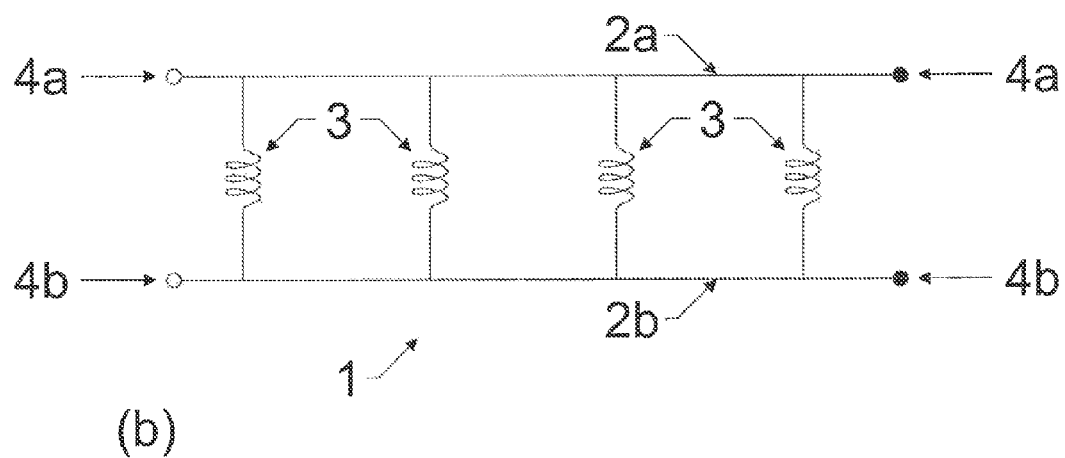
Figure 2:
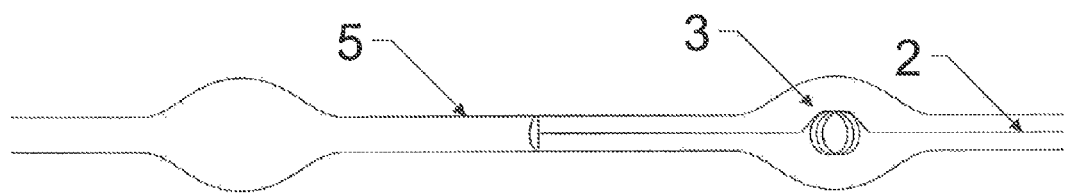
FIG. 2(*a*) is a partially cut away section view of a Cable Assembly wired in series, with cut away sections revealing Source Inductive Elements.
Figure 2:
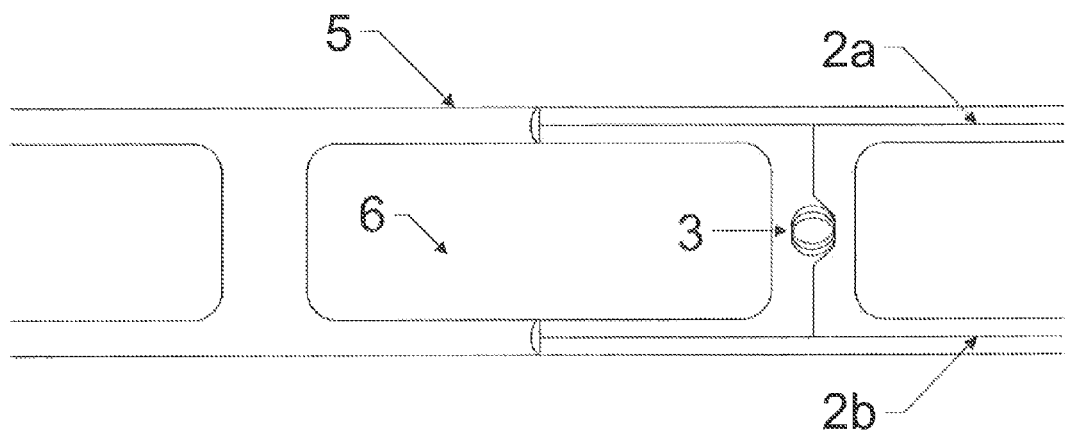

Structure and Use in Monitoring System Applications:

With reference to the electrical circuit diagrams in FIG. 1, the first aspect of the invention comprises an encapsulated Cable Assembly 1 that minimally comprises wiring 2 for transmitting power and a plurality of Source inductive Elements 3. Alternating current is applied to the wiring 2 at the terminals 4 so that each Source Inductive Element 3 generates an alternating magnetic field. An embodiment of said encapsulation is illustrated in FIG. 2.

In FIG. 1(*a*), said Source inductive Elements 3 are wired in a series configuration and therefore the magnetizing current for said Source Inductive Elements 3 is present only when there is current circulating in the wire loop 2. With reference to FIG. 1(*a*), the Source Inductive Elements 3 can be the wiring 2 without any helical or concentric windings because even a straight wire that carries an alternating current generates an alternating magnetic field that can be used to extract power by inductively coupled means, although the deuce of inductive coupling is minimal in this case. Therefore, said Source Inductive Elements 3 preferentially comprise helical or concentric windings.

In FIG. 1(*b*), said Source Inductive Elements 3 are connected in parallel between two wires 2*a* and 2*b* and therefore magnetizing current is available whenever a voltage is present across said wires 2*a* and 2*b*. In this configuration, said Source Inductive Elements 3 must comprise helical or concentric windings.

Alternatively, a Cable Assembly 1 Wherein some of the Source Inductive Elements 3 are connected in series and the remainder are connected in parallel could be constructed.

Preferentially, all said helical or concentric windings encircle a magnetically permeable material to further increase the degree of inductive coupling between a Source Inductive Element 3 and a Sink Inductive Element that supplies power to a Monitoring Node. The Sink Inductive Element and the Monitoring Node are described later herein.

A plurality of wires can be included in the Cable Assembly 1 thereby providing additional or redundant paths for power or for providing one or more dedicated paths for wireline communications.

Illustrative embodiments of the encapsulation of the Cable Assembly 1 are shown in the partial cutaway drawings in FIG. 2. The encapsulation material 5 may comprise multiple layers, for example, the wires could be insulated with cross-linked polyethylene and then the insulated wires and inductive coupling elements could then be encapsulated in polyethylene. The encapsulation serves to electrically insulate the wires and could also protect the Cable Assembly 1 from the environment or mechanical stresses.

The encapsulation of the series-connected Cable Assembly 1 of FIG. 1(*a*) is illustrated in FIG. 2(*a*). An advantage of this circuit configuration is that only a single wire is required to run along the cable, thereby allowing any physical path from terminal 4*a* to terminal 4*b*. This configuration can result in lower cost for the Cable Assembly 1, especially when the Cable Assembly 1 is required to cover a large area.

The encapsulation of the parallel-connected Cable Assembly 1 of FIG. 1(*b*) is illustrated in FIG. 2(*b*). The Source Inductive Elements 3 draw their required current from the voltage between the wires 2*a* and 2*b*. For said parallel connection it is advantageous to have a fairly wide spacing between the wires 2*a* and 2*b* because this reduces losses in the cable, but conductor spacing is not an aspect of this invention. The voids 6 in the encapsulation material 5 illustrated in FIG. 2(*b*) are not required and serve only to reduce the required volume of encapsulation material.

Figure 3:
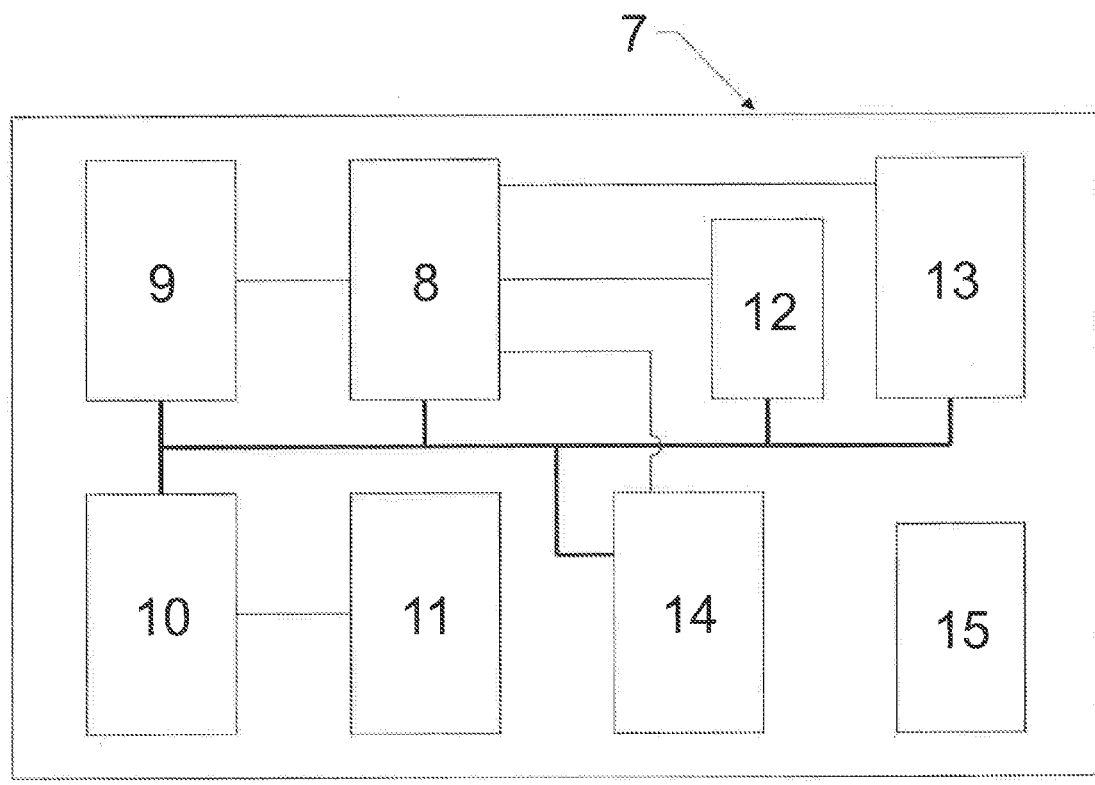
FIG. 3 is a block diagram of a monitoring node.

FIG. 3 is a block diagram of a Monitoring Node 7. A Monitoring Node 7 minimally comprises a microcontroller or microprocessor 8, a sensor interface 9, a power supply 10, and a Sink Inductive Element 11 that serves to extract power from a Source Inductive Element 3 in the Cable Assembly 1. Said Sink Inductive Element 11 is preferably installed in close proximity to a Source Inductive Element 3 in the Cable Assembly 1, thereby facilitating power transfer from the Source Inductive Element 3 to the Sink inductive Element 11. In FIG. 3, narrow lines indicate data connections whereas thick lines indicate power connections.

Any Monitoring Node 7 can have a local energy storage element such as a rechargeable battery or a capacitor, which can be used to power the Monitoring Node 7 in the event of a drop in power in the Cable Assembly 1. Additionally, said local energy storage node can be used to provide additional power for data transmission.

Any Monitoring Node 7 can have a local data storage element 12, such as flash memory. Any Monitoring Node 7 can have a global positioning satellite (hereinafter GPS) receiver 14 or a radio-frequency identification (hereinafter RFID) device 15 to facilitate locating said Monitoring Node 7 after system deployment.

Preferentially, each Monitoring Node 7 has a wireless or inductively coupled communication element 13 for communicating with another Monitoring Node 7 or with some other system component in a system control and data acquisition (SCADA) system.

Preferentially, each Monitoring Node 7 has a digital identifier that can be used to identify that Monitoring Node 7 when a plurality of Monitoring Nodes 7 is installed on a Cable Assembly 1.

Figure 4:
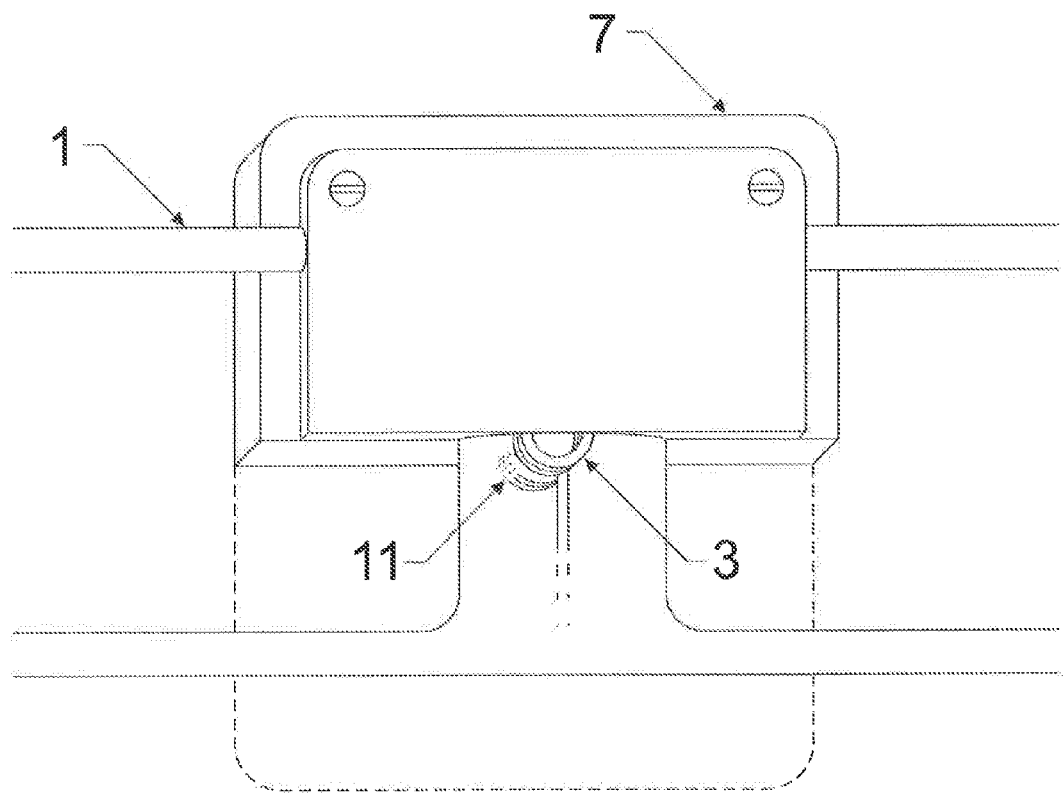
FIG. 4 is a partially cut away section view of a monitoring node mounted on a Cable Assembly wired in parallel.

FIG. 4 is a partial cutaway drawing illustrating the mounting of a Monitoring Node 7 on a Cable Assembly 1 for an illustrative embodiment of the invention. In this embodiment, the Cable Assembly 1 is configured as in FIG. 1(*b*) and is manufactured in a manner that facilitates the alignment of the mutually inductive elements. In this embodiment, the case of the Monitoring Node 7 has recessed alignment channels that mate to the Cable Assembly 1. Said alignment channels thereby serve to align the Source Inductive Element 3 with the Sink Inductive Element 11. Other methods of alignment include alignment pegs, holes, or other embodiments of recessed channels.

In the current embodiment, each Monitoring Node 7 comprises a microcontroller 8, a plurality of sensor interfaces 9, a power supply 10 that uses current from the Sink Inductive Element 11, and a RFID device 15. In this embodiment, the Sink Inductive Element 11 also serves as an inductively coupled communication element 13, thereby using the wiring 2 in the Cable Assembly as a communications medium. Said Monitoring Node 7 can operate continuously or, to conserve power, it may operate periodically or on a random schedule. Additionally, it may switch to a higher-power operating mode in response to data received from a sensor.

Many different types of sensors, multiple sensors of the same type, or any combination thereof could be connected via sensor interfaces 9 to any Monitoring Node 7. Said sensor types include chemical sensors, temperature sensors, pressure sensors, and accelerometers.

For the monitoring of petrochemical pipelines a plurality of chemical sensors can be positioned along the route of the pipeline wherein each said chemical sensor is connected to a Monitoring Node 7, thereby enabling the detection and localization of leaks in the pipeline. In the current embodiment, said chemical sensors are polymer absorption sensors.

Pipeline operators are also concerned with events that may affect the physical integrity of the pipeline, such as vibrational events that are harbingers of potential damage from construction activities, farming equipment, earthquakes, landslides, or vandalism. The movement of pipelines from geological displacement is also of concern because it can cause physical damage or cause the pipeline to move outside of its legal right-of-way. The formation of a crack in the pipeline can also generate vibrations. Therefore, any of the sensors attached to a Monitoring Node 7 can be a displacement sensor such as a vibration sensor, accelerometer, or inertial displacement sensor.

While the preferred mode of implementation is through inductive coupling, the invention described herein could also be implemented by directly connecting the wiring in the Cable Assembly 1 to the Monitoring Node 7, i.e., without using inductive coupling means for transferring power or for communications. Such an implementation would lose the benefit of retaining the integrity of the Cable Assembly 1 when attaching a Monitoring Node 7, but this may be acceptable in some applications. In such applications, data communication preferably uses said power wiring in the Cable Assembly and communications along said wiring is achieved through frequency-division multiplexing (hereinafter FDM). With FDM, the communication signal can be capacitively coupled to said wiring.

Advantages:

The above described Cable Assembly and monitoring system is ideal where there is a requirement for sensor deployment over a long distance or over a large area. The sensor system utilizes powered monitoring nodes, each of which may be connected to a plurality of sensors. Power for each monitoring node is extracted by inductive means from wires that carry alternating current. These wires, or additional wires, can be used for data communication, which is also via inductive means. The wires and source inductive elements comprise a sealed cable assembly that can be can be several kilometers long. An advantage of using a sealed cable assembly is that the insulation or protective jacketing on the cable assembly retains its integrity, thereby greatly improving the reliability of the system.

Although the current invention is not limited to pipeline applications, it can be used for pipeline leak detection by employing a suitable sensor technology, such as a polymer absorption sensor, as described later herein.

A key aspect of the current invention is that each monitoring node is powered by inductively coupling to a cable assembly, where this cable assembly can also be used for data transport. Unlike the existing art, the cable assembly for this invention includes wired inductive elements and the entire cable assembly is environmentally sealed within a protective layering during the manufacturing process. Because inductive coupling is used to transfer power to components outside of the cable assembly, the cable assembly can remain sealed because there is no need to penetrate or otherwise compromise the integrity of the protective layer either when deploying the system or during system maintenance. This results in improved reliability and reduced installation and maintenance costs.

Inductive coupling has been disclosed for use in underwater networks by B. Howe and T. McGinnis in "Sensor Networks for Cabled Ocean Observatories", IEEE 2004 International Symposium on Underwater Technology, pp. 113-120. Although the current art discloses inductive coupling in sensor networks, the inductive elements are spliced into the cable when the sensor network is assembled in the field, thereby requiring the cable to be resealed against the environment, which is a major disadvantage when compared to the current invention.

The current invention is well suited to pipeline monitoring because the inductive elements within the cable assembly can be regularly spaced to meet the sensor spacing requirements for the pipeline. And, since multiple sensors can be connected to each monitoring node, the spacing of the inductive elements can be a multiple of the sensor spacing, thereby reducing the number of monitoring nodes and the overall system cost.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A Cable Assembly for supplying power, comprising:
   an elongated cable body having a length of from several meters to several kilometers, the cable body comprising in combination:
   wiring for carrying alternating electrical current;
   a plurality of Source Inductive Elements spaced at intervals along the wiring to provide power by induction, and the spacing of the plurality Source Inductive Elements creating distinct induction sites, along the length of the cable body, capable of providing power by induction to a plurality of distinct power consuming nodes located at spaced intervals; and
   an encapsulation layering that provides electrical insulation;
   a monitoring system having a plurality of Monitoring Nodes, each of the Monitoring Nodes is powered by inductive coupling of a Sink Inductive Element to one of said Source inductive Elements, and each of the Monitoring Nodes monitors signals from at least one sensor, the at least one sensor including a chemical sensor for detecting hydrocarbons.

2. The Cable Assembly of claim 1 wherein each said Source Inductive Element is in series with said wiring.

3. The Cable Assembly of claim 1 wherein said wiring minimally comprises two wires and each said Source Inductive Element is connected between two said wires.

4. The Cable Assembly of claim 1 wherein said wiring minimally comprises two wires and wherein some of said Source Inductive Elements are connected in series with any of said wires and the remainder of said Source Inductive Elements are connected between any two said wires.

5. A cable Assembly for supplying power, comprising:
an elongated cable body from several meters to several kilometers in length, the cable body comprising in combination:
wiring for carrying alternating electrical current;
a plurality of Source Inductive Elements spaced at intervals along the wiring to provide power by induction, the spacing of the plurality Source Inductive Elements creating distinct induction sites along the length of the cable body capable of providing power by induction to a plurality of distinct power consuming nodes located at spaced intervals;
an encapsulation layering that provides electrical insulation; and
a monitoring system having a plurality of Monitoring Nodes, each of the Monitoring Node is powered by inductive coupling of a Sink Inductive Element to one of said Source Inductive Elements, and each of said Monitoring Node monitors signals from at least one sensor, the monitoring system additionally comprises a location device selected from one of a GPS receiver or RFID device that is used to provide positional information.

6. The Cable Assembly of claim 1, wherein the monitoring system additionally comprises means for transmission of a communications signal along said wiring wherein said communications signal is inductively coupled between said Monitoring Node and any said wires that carry alternating electrical current.

7. A Cable Assembly for supplying power, comprising:
an elongated cable body from several meters to several kilometers in length, the cable body comprising in combination;
wiring for carrying alternating electrical current;
a plurality of Source Inductive Elements spaced at intervals along the wiring to provide power by induction, the spacing of the plurality Source Inductive Elements creating distinct induction sites along the length of the cable body capable of providing power by induction to a plurality of distinct power consuming nodes located at spaced intervals;
an encapsulation layering that provides electrical insulation; and
a monitoring system having a plurality of Monitoring Nodes, each of the Monitoring Nodes is powered by inductive coupling of a Sink Inductive Element to one of said Source Inductive Elements, and each of the Monitoring Nodes monitors signals from at least one sensor, the monitoring system additionally comprises means for transmission of a communications signal along wires that are dedicated to the purpose of communications wherein said communications signal is inductively coupled between said Monitoring Node and said wires.

8. A Cable Assembly for supplying power, comprising:
an elongated cable body from several meters to several kilometers in length, the cable body comprising in combination;
wiring for carrying alternating electrical current;
a plurality of Source Inductive Elements spaced at intervals along the wiring to provide power by induction, the spacing of the plurality of Source Inductive Elements creating distinct induction sites along the length of the cable body capable of providing power by induction to a plurality of distinct power consuming nodes located at spaced intervals;
an encapsulation layering that provides electrical insulation; and
a monitoring system having a plurality of Monitoring Nodes, each of the Monitoring Node is powered by inductive coupling of a Sink Inductive Element to one of said Source Inductive Elements, and each of the Monitoring Nodes monitors signals from one or more sensors, wherein the one or more sensors includes an accelerometer monitoring at geological displacement and vibrational events.

9. The Cable Assembly of claim 1, wherein the chemical sensor is a polymer absorption sensor.

10. A Cable Assembly for supplying power, comprising:
an elongated cable body from several meters to several kilometers in length, the cable body comprising in combination:
wiring for carrying alternating electrical current;
a plurality of Source Inductive Elements spaced at intervals along the wiring to provide power by induction, the spacing of the plurality Source Inductive Elements creating distinct induction sites along the length of the cable body capable of providing power by induction to a plurality of distinct power consuming nodes located at spaced intervals;
an encapsulation layering that provides electrical insulation; and
a monitoring system having plurality of Monitoring Nodes, each of the Monitoring Nodes is powered by inductive coupling of a Sink Inductive Element to one of said Source Inductive Elements, and each of the Monitoring Nodes monitors signals from at least one sensor, the monitoring system additionally comprises means for transmission of a communications signal along said wiring, said communications signal is inductively coupled between said Monitoring Node and any of said wires that carry alternating electrical current, wherein data transmission along said wiring is realized using frequency-division multiplexing.

* * * * *